INVENTOR.
LEWIS L. HARING
WALTER R. OPPEN
BY

United States Patent Office 3,437,910
Patented Apr. 8, 1969

3,437,910
AUTOMATIC RESETTING MEANS FOR TRANSFORMER ENERGIZED BY ASYMMETRICAL WAVEFORMS
Lewis L. Haring, Brooklyn, and Walter R. Oppen, Plandome, N.Y., assignors to Sperry Rand Corporation, Ford Instrument Company Division, Long Island City, N.Y., a corporation of Delaware
Filed May 18, 1967, Ser. No. 639,528
Int. Cl. H02n 1/00; H02m 7/44
U.S. Cl. 322—2  10 Claims

ABSTRACT OF THE DISCLOSURE

In a system for stepping up the voltage output of thermionic converters by utilizing a transformer, a signal produced by monitoring the voltage across the transistorized reset switch to detect the approach of transformer saturation during the reset pulse is utilized for the automatic production of a reset pulse of variable and proper length so that the volt-seconds appearing across the transformer during the power delivery and extinguish cycles are equal and opposite thereby preventing saturation of the transformer core.

---

In general this invention relates to means for stepping up the voltage output of thermionic energy converters and more particularly relates to the utilization of a transformer means for this purpose provided with means to automatically produce a reset pulse of variable and proper length to maximize the duty cycle of the thermionic energy converter and/or to avoid wasted switching power.

Thermionic diodes of the type described in the Haring et al. U.S. Patent 3,155,849 issued Nov. 3, 1964 for a Thermionic Converter provide efficient means for the direct conversion of heat to electricity. Unfortunately, such conversion produces low output voltages so that means must be provided to raise this low voltage to a useful value.

For reasons of efficiency, it has been found desirable to utilize a transformer for voltage step up and operate the thermionic diode intermittently thereby generating an asymmetrical waveform which is fed to the transformer input winding. In order to prevent saturation of the transformer core, it is necessary to provide reset pulses during the period when the diode is extinguished.

In systems of this type the volt seconds per turn applied to the transformer during the firing and reset cycles must equal the volt seconds applied during the load and extinguishing cycles or else the transformer core will saturate during either the reset or extinguishing cycles. Should saturation occur, current through one or more of the transistor switching elements will be limited only by the internal impedance of such element plus the resistance voltage drop in the transformer winding thereby causing excessive heating of the switching transistor.

The prior art provided manual methods to avoid transformer core saturation. One such prior art method required visual observation of the magnitude of the extinguish voltage across the transformer. When a sudden drop in this voltage was noted, indicating the onset of saturation, manually operable means lengthened the reset pulse width to compensate. An alternate method for manual reset was to provide a reset pulse of maximum width, monitor the extinguishing voltage and manually decrease the power pulse length. Neither of these manual methods has proven effective to eliminate power waste or excessive heating of the transistor switches.

In order to overcome the difficulties noted above, the instant invention provides automatic means for the production of a reset pulse of variable and proper length so that the voltage seconds appearing across the transformer during the power delivery and extinguishing cycles exactly cancel the volt seconds appearing during the reset and firing cycles. This is accomplished by monitoring the voltage across the reset transistor switch to detect the approach of transformer saturation during the reset pulse. Such voltage increases as the transformer core approaches saturation because of greater magnetizing current. Utilizing this approach, the duty cycle of the diode may be maximized since none of the reset pulses exceed in volt seconds the volt seconds required for proper switching operation with the added benefit that switching power is no longer wasted.

Accordingly, a primary object of the instant invention is to provide novel means for automatic control of a transformer type means for stepping up the output voltage of thermal converters.

Another object is to provide control means of this type which automatically produces reset pulses of proper duration to avoid transformer core saturation without sacrificing efficiency of operation.

Still another object is to provide control means of this type which is responsive to the approach of transformer saturation during the reset pulse.

A further object is to provide a control means of this type which monitors the voltage across the transistor reset switch with the greater magnetizing current causing this voltage to increase as the transformer approaches saturation.

A further object is to provide a control means of this type which maximizes the duty cycle of the energy converter and avoids wasted switching power.

These as well as other objects of this invention will become readily apparent after reading the following description of the accompanying drawings in which.

Figure 4:
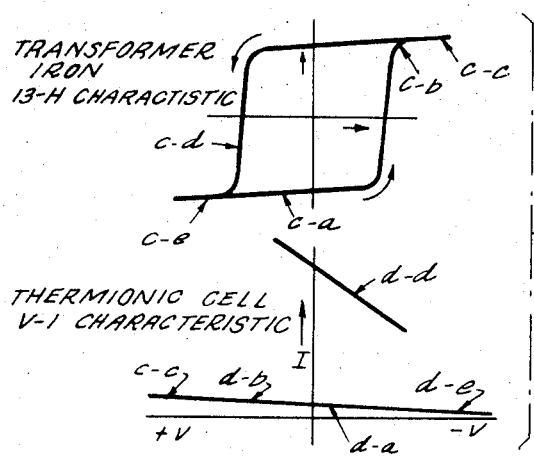
FIGURE 4 is a time comparison between the transformer iron B–H characteristic and the thermionic cell V–I characteristic.
Figure 5:
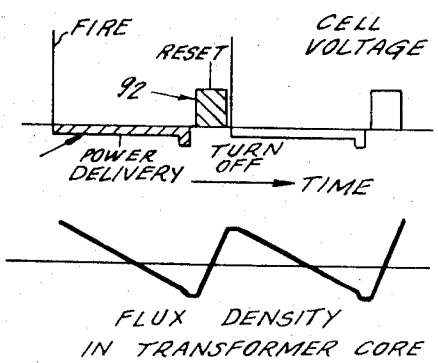
FIGURE 5 is a time comparison between the flux density of the transformer core and the voltage of the thermionic cell.
Figure 3:
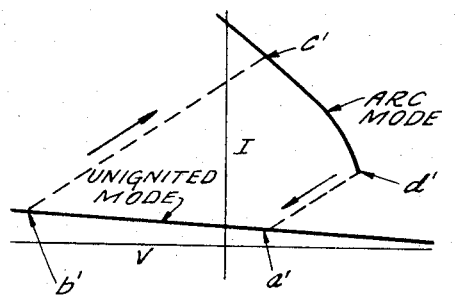
FIGURE 3 is a graph showing the V–I characteristic of a thermionic diode.

Now referring to the figures and more particularly to the schematics of FIGURES 3 through 5. As seen in FIGURE 3, thermionic diode cell 10 (FIGURE 1) exhibits a volt current characteristic typical of gaseous discharge devices. That is, cell 10 will ignite or fire when a critical voltage is applied thereto and will extinguish itself when the current conducted by the cell is reduced to less than a critical value. Thus, cell 10 has two modes of operation; namely, an unignited mode in which the internal resistance is very high, and an arc mode in which the internal resistance is very low permitting the delivery of considerable power into a matched load.

In the unignited mode (lower curve FIGURE 3), cell 10 will deliver a very small current to a load (as at $a'$) because space charge within cell 10 limits the thermionic current. As the voltage across cell 10 is increased by the application of an external source of voltage, current increases slowly until approximately four volts appear across cell 10 (as at $b'$).

When the voltage across cell 10 rises above the critical value at $b'$, an arc forms and cell current suddenly increases to a high value. Since the ions formed by the arc neutralize the electronic space charge, the internal cell resistance drops to a very small fraction of an ohm so that cell 10 is now operating in the arc mode (as at $c'$ on the upper curve of FIGURE 3) and delivers considerable power to a load. Now, if the external resistance is increased cell current decreases along the arc mode characteristic line until point $d'$ is reached where current is now too low to sustain an arc and thermionic cell 10 drops into the unignited mode at point $a'$. Thus, it would seem that the two mode characteristic of cell 10 enables it to be operated as a combined inverter and power source to supply pulsating current to a load.

Figure 1:
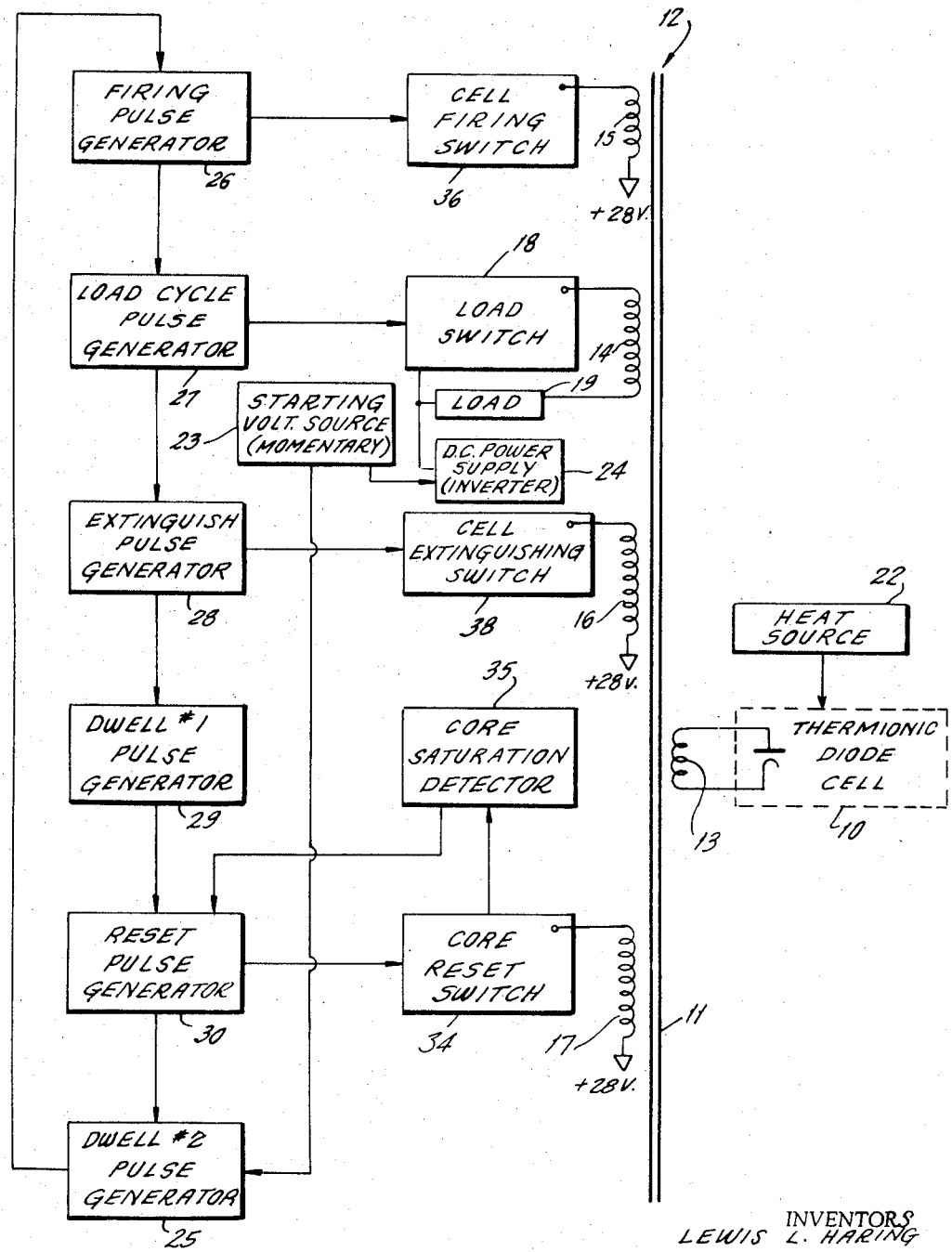
FIGURE 1 is a functional block diagram and schematic of a system, including portions constructed in accordance with the teachings of the instant invention, for utilizing transformer means to increase the voltage generated by a thermionic diode cell.

As seen in FIGURE 4, a comparison of V–I characteristic and the B–H characteristic of the toroidal core 11 of transformer 12 (FIGURE 1) shows the necessity for providing means to automatically prevent core saturation. More particularly, assuming that the equipment has been brought to operating temperature and is in the unignited mode, a slight thermionic current flows through primary winding 13 (FIGURE 1). Thus, core 11 is operating at $c$–$a$ and cell 10 is operating at $d$–$a$.

Core 11 is reset by the application of a voltage less than the firing voltage to cell 10. Now cell 10 is operating at $d$–$b$ and the flux in core 11 changes from $c$–$a$ to $c$–$b$ on the hysteresis loop under the influence of the reset voltage. Next, a firing pulse is applied to cell 10 bringing its operation to $d$–$c$ accompanied by a change in core condition to $c$–$c$. At the conclusion of the firing pulse switch 18 (FIGURE 1) connecting load 19 to secondary winding 14 is closed. Now cell 10 operates at $d$–$d$ while the flux in the transformer core travels along the hysteresis loop to point $c$–$d$.

Prior to saturation of core 11, cell 10 is extinguished by opening load switch 18 and applying an extinguishing pulse to cell 10. With load 19 disconnected, cell 10 attempts to discharge into primary winding 13 which now exhibits a very high impedance causing cell current to drop below the critical holding value ($d'$ of FIGURE 3) and the arc is extinguished with cell 10 now operating at $d$–$e$ and core 11 operating at $c$–$e$ at the conclusion of the extinguishing pulse.

Now referring to FIGURE 1 for a general description of system operation. With thermionic diode cell 10 at operating temperature as a result of energy supplied by heat source 22, starting voltage source 23 is operated momentarily to initiate operation of dwell #2 pulse generator 25 is well as D.C. power supply inverter 24. Starting voltage source 23 also sustains operation of D.C. power supply 24 until cell 10 is fired. D.C. power supply 24 is connected in parallel with load 19 and, although not shown, delivers appropriate operating voltages for the electronic switching elements of the system.

Dwell #2 pulse generator 25 as well as the other pulse generators 26–30 inclusive are one shot transistorized monostable multivibrators such as Model T-166 manufactured by Engineered Electronics Company, Santa Ana, Calif. The conclusion of the pulse from generator 25 signals the beginning of operation for firing pulse generator 26. The pulse from generator 26 is fed to cell firing switch 36 which generates a signal in firing winding 15 of transformer 12 bringing cell 10 into its arc mode.

At the conclusion of the firing pulse, load cycle pulse generator 27 commences operation closing load switch 18 thereby connecting load 19 to secondary winding 14. The end of the pulse from generator 27 commences operation of extinguish pulse generator 28 controlling the operation of cell extinguishing switch 38 for generating a signal in extinguishing winding 16 which generates a signal to terminate operation of cell 10. The extinguishing signal is a voltage applied to cell 10 in the same polarity as that of cell 10 during its power delivery. The magnitude of this extinguishing voltage is several times that which the cell develops when delivering power to a normal load.

At the conclusion of the pulse from generator 28 operation of dwell #1 pulse generator 29 begins. The pulse from generator 29 delays application of the reset pulse through reset winding 17 to prevent premature firing of cell 10 during the reset pulse. By adjusting the length of pulse from generator 29 load voltage regulation may be achieved. The end of the pulse from generator 29 initiates operation of reset pulse generator 30.

As will hereinafter be explained, in the absence of a bolstering signal from core saturation detector 35 being fed to generator 30, the duration of the pulse generated by the latter would be too short to maintain core reset switch 34 closed for a sufficient length of time to generate the required reset pulse in reset winding 17. The conclusion of the pulse from generator 30 signals the initiation of the operation for dwell #2 pulse generator 25 with operation of the latter commencing a repetitive chain of events as previously described.

Figure 2:
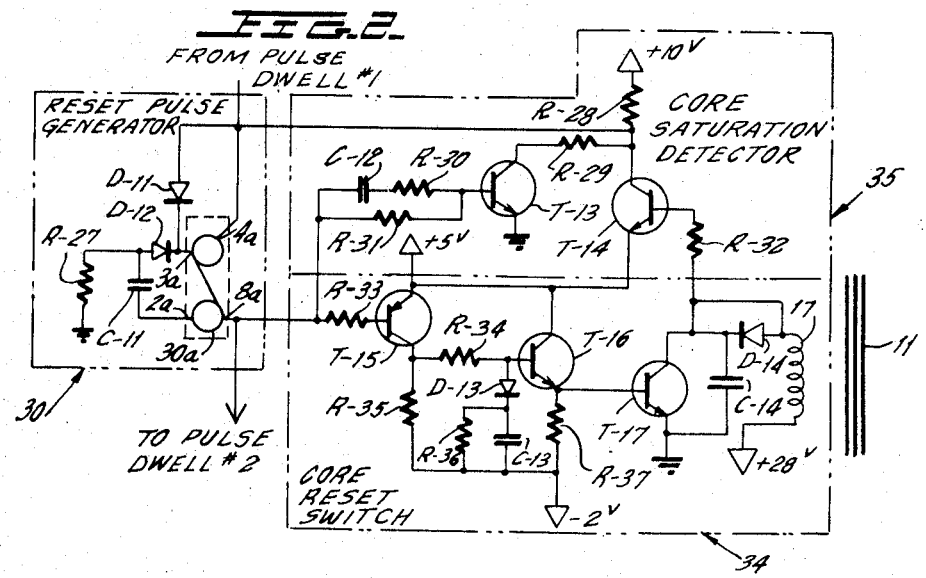
FIGURE 2 is an electrical schematic showing the elements of FIGURE 1 constituting the means for generating a core reset pulse and automatically controlling the length of this pulse so as to prevent core saturation.

Now referring more particularly to FIGURE 2, for schematic of the electrical elements constituting a detailed reset pulse generator 30, core reset switch 34 and core saturation detector 35. One terminal of core reset winding 17 is connected to +28 volts while the other end of winding 17 is connected through diode D–14 to the collector of transistor T–17 having a grounded emitter. Capacitor C–14 is connected in parallel with the emitter collector circuit of T–17.

The base of T–17 is connected to the emitter of transistor T–16 which in turn is connected through resistor R–17 to −2 volts. The collector of T–16 as well as the emitter of transistor T–15 are connected to +5 volts. The base of T–16 is connected through resistor R–34 to the collector of T–15, the latter being connected through resistor R–35 to −2 volts. the base of T–16 is connected to −2 volts through diode D–13 in series with the parallel combination of capacitor C–13 and resistor R–36. The base of T–15 is connected through resistor R–33 to the output terminal 8a of one shot multivibrator 30a.

The collector of T–17 is connected through resistor R–32 to the base of transistor T–14 The emitter of T–14 is connected to +5 volts while the collector thereof is connected through resistor R–28 to +10 volts and is also connected through resistor R–29 to the collector of transistor T–13. The emitter of T–13 is grounded while the base thereof is connected through resistor R–31 to vibrator terminal 8a. The series combination of resistor R–30 and capacitor C–12 is connected in parallel with resistor R–31.

The collector of T–14 is also connected through diode D–11 to vibrator terminal 3a. The series combination of capacitor C–11 and diode D–12 extends between vibrator terminals 2a and 3a with one terminal of capacitor C–11 being connected directly to terminal 2a. Resistor R–27 is connected from ground to the juncture between capacitor C–11 and diode D–12.

Operation of the circuit elements illustrated in FIGURE 2 is initiated by a signal generated by termination of the pulse from dwell #1 pulse generator 29. This signal is fed to the input terminal 4a of one shot multivibrator 30a in reset pulse generator 30 triggering the latter into generating a pulse. In the absence of a signal from core saturation detector 35 this pulse would remain on for approximately 100 microseconds during which core reset switch 34 turns on and core saturation detector 35 stabilizes. Current flows through resistor R–28 and diode D–11 into vibrator terminal 3a prolonging the pulse from generator 30 beyond the initial 100 microseconds. As long as this pulse continues, core reset switch 34 remains closed and current flows through reset winding 17 to reset core 11.

When the iron in core 11 saturates there is an increase of current through reset winding 17 causing the drop through transistor T-17 to increase until it exceeds 5 volts. This action biases the base of T-14 in the forward direction causing it to conduct, preventing further flow of current into terminal 3a of vibrator 30a. This causes vibrator 30a to immediately switch to its quiescent state opening core reset switch 34 thereby stopping further reset action.

Diode D-13 and capacitor C-13 are provided for controlling the rate of rise and fall of current in winding 17 so that the application of reset current to winding 17 is relatively slow to prevent ringing, while reduction of this current to zero is nearly instantaneous to prevent complete saturation of core 11 and permit some volt-seconds to remain for the firing pulse generated by cell firing switch 36. More particularly, upon the application of a pulse to core reset switch 34 the base of T-16 rises in voltage slowly since diode D-13 places capacitor C-13 in parallel with the base of T-16. However, upon removal of this pulse diode D-13 isolates the base of T-16 from capacitor C-13 and transistor T-16 becomes non-conducting virtually instantaneously turning off transistor T-17 and the current supplied to reset winding 17.

Capacitor C-14 is placed across T-17 to maintain +28 volts on the collector of T-17 during the firing pulse and prevent spurious operation of core saturation detector 35. That is, the application of a firing pulse to transformer winding 15 places a negative voltage on the cathode of blocking diode D-14. In the absence of capacitor C-14, this negative voltage would appear at the collector of T-17 because of the internal capacitance of diode D-14. Thus, the voltage at the collector of T-17 is kept above the value which core saturation detector 35 operates to prevent spurious operation of reset pulse generator 30 during the firing pulse.

Thus, it is seen that core saturation detector 35 controls the length of the reset pulse fed by reset pulse generator 30 to core reset switch 34 with this control being a function of the saturation condition of core 11. The circuit elements of FIGURE 2 are so proportioned that the volt-seconds during reset (indicated by the shaded area 92 in the upper curve of FIGURE 5) equals the volt-seconds during the power delivery and turn off portions of the cycle (shaded portion 91 in the upper curve of FIGURE 5). Further, as seen in FIGURE 5, reset is accomplished at a much higher voltage than the operating voltage. Hence, reset requires much less time than power delivery thereby permitting a high duty cycle for thermionic diode 10.

Thus, it is seen that the instant invention provides novel means for automatically controlling transformer core reset in a system for multiplying the voltage output of an energy converter and because of this the length of each duty-reset cycle is minimized since none of the reset pulse lengths are in excess of those required for proper switching operation. Further, switching power is maintained at a minimum.

Although there has been described a preferred embodiment of this novel invention, many variations and modifications will now be apparent to those skilled in the art.

What we claim is:

1. In a system for stepping up the voltage output of an energy converter producing a unidirectional electrical output, a transformer having a primary winding, switch means pulse operating said converter to transform said output into a pulsating D.C. waveform fed to said primary winding, and reset means coordinated in operation with said switch means for producing reset pulses fed to said transformer with said reset pulses and pulses of said pulsating D.C. waveform being of opposite polarity to prevent saturation of the core of said transformer, wherein the improvement comprises control means for automatically adjusting said reset pulses to lengths sufficient to prevent saturation of said core, said control means including a detector means for detecting approach of core saturation during each of said reset pulses and means responsive to said detector means for terminating said reset pulses prior to saturation of said core.

2. A system as set forth in claim 1 in which said control means also includes a solid state switching means controlling application of said reset pulses to said transformer, said detector means monitoring voltage across said switching means.

3. A system as set forth in claim 1 in which said energy converter is connected directly to said primary winding and said switch means acts through a secondary winding of said transformer to control pulse operation of said converter.

4. A system as set forth in claim 1 in which each of said reset pulses are automatically adjusted to minimum length without permitting said core to said saturate.

5. A system as set forth in claim 2 in which said reset means also includes a generator having a natural pulse output of predetermined length, said pulse output fed to said switching means to close the latter, with said switching means and said core unsaturated said detector generating signals fed to said generator to prolong said pulse output beyond said predetermined length.

6. A system as set forth in claim 2 including means generating firing pulses fed through said transformer to initiate operation of said converter at the beginning of each cycle of said pulsating D.C. waveform, additional means connected to said switching means to prevent spurious operation of said control means as a result of said firing pulses.

7. A system as set forth in claim 6 in which said transformer includes a reset winding through which said reset pulses are transmitted to said core, said switching means including a semi-conductor having base, emitter and collector electrodes, a diode through which said reset winding is connected to a circuit including said emitter and collector electrodes, said control means connected to said circuit at said diode.

8. A system as set forth in claim 7 in which said additional means includes a capacitor connected across said circuit.

9. A system as set forth in claim 2 in which the transformer includes a reset winding through which said reset pulses are transmitted to said core, said switching means including a portion to delay current buildup in said reset winding upon the start of each of said reset pulses and to accelerate current decay in said reset winding at the end of each of said reset pulses.

10. A system as set forth in claim 8 in which said switching means includes a semi-conductor having a control electrode, said further means including a capacitor and diode connected in series to said control electrode.

References Cited

UNITED STATES PATENTS

| 2,826,731 | 3/1958 | Paynter | 321—2 |
| 3,034,072 | 5/1962 | Hakimoglu | 331—113.1 |
| 3,146,388 | 8/1964 | Rasor | 310—4 X |
| 3,273,048 | 9/1966 | Hoff et al. | 322—2 |
| 3,311,805 | 3/1967 | Kittl et al. | 321—2 |
| 3,381,201 | 4/1968 | Angello | 321—2 |

JOHN F. COUCH, *Primary Examiner.*

W. H. BEHA, JR., *Assistant Examiner.*

U.S. Cl. X.R.

321—44